Aug. 27, 1963   W. L. WILCOX   3,102,025
OVERLAY WELDING ELECTRODE
Filed Dec. 23, 1960
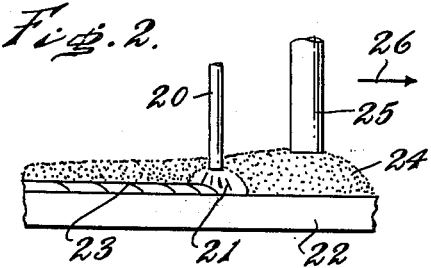
Fig. 2.
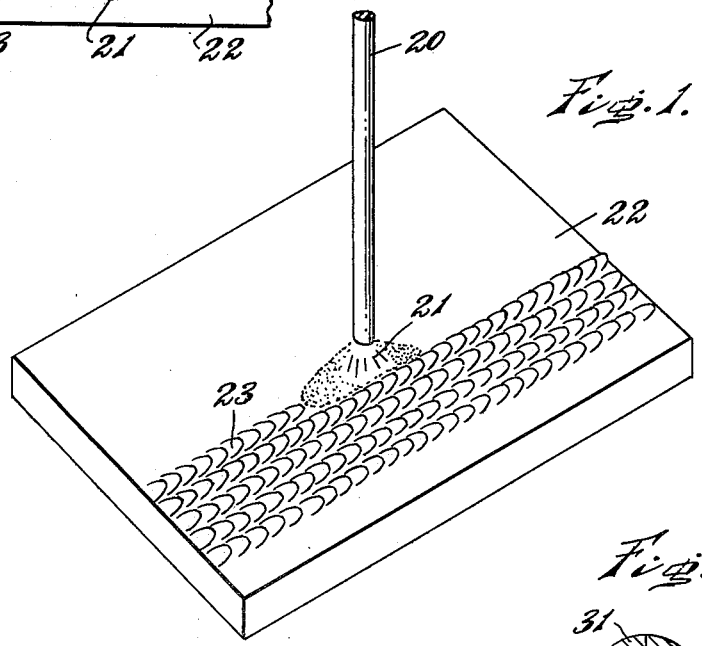
Fig. 1.
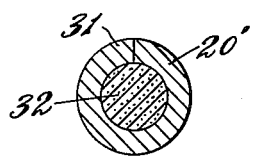
Fig. 4.
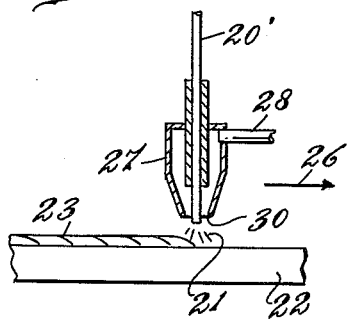
Fig. 3.
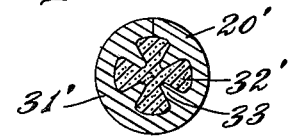
Fig. 5.
INVENTOR
Wayne L. Wilcox
BY
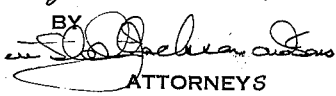
ATTORNEYS

3,102,025
OVERLAY WELDING ELECTRODE

Wayne L. Wilcox, Havertown, Pa., assignor to Arcos Corporation, Philadelphia, Pa., a corporation of Pennsylvania
Filed Dec. 23, 1960, Ser. No. 78,054
2 Claims. (Cl. 75—128)

The present invention relates to electric arc welding electrodes for depositing type 316 and 317 stainless steel deposits on steel work, and methods of electric arc welding for overlay purposes.

The present application is a continuation-in-part of my copending application Serial No. 58,592, for Overlay Welding Electrode, filed September 14, 1960, and now abandoned.

The purpose of the invention is to obtain satisfactory overlay welds of type 316 and 317 stainless steel on plain carbon and low alloy steel work.

A further purpose is to avoid difficulty through cracking in type 316 and type 317 stainless steel overlay welding on plain carbon and low alloy steel, especially where the weld metal joins the base metal.

A further purpose is to precisely control the retained ferrite in the overlay by an improved analysis of electrode which with the resulting dilution will secure a content of retained ferrite which will be adequate but not excessive.

Further purposes appear in the specification and in the claims.

In the drawings I have chosen to illustrate mechanism which will be useful in applying the invention.

FIGURE 1 is a fragmentary diagrammatic perspective of an overlay weld being formed using the electrode of the invention.

FIGURE 2 is a fragmentary diagrammatic vertical section of submerged arc welding according to the invention.

FIGURE 3 is a fragmentary diagrammatic vertical section of welding according to the invention in an atmosphere of protective gas.

FIGURE 4 is a diagrammatic transverse section of one form of welding electrode according to the invention.

FIGURE 5 is a diagrammatic transverse section of another form of welding electrode of the invention.

Describing in illustration but not in limitation and referring to the drawings:

Considerable difficulty has been encountered in obtaining sound overlay welded deposits of type 316 and type 317 stainless steel on plain carbon and low alloy steel base metal for the purpose of producing tanks, retorts, pressure vessels and the like.

It will be remembered that type 316 stainless steel has the following analysis:

| | |
|---|---|
| Carbon | 0.08% maximum. |
| Chromium | 16.00% to 18.00%. |
| Nickel | 10.00% to 14.00%. |
| Molybdenum | 2.00% to 3.00%. |

Type 317 stainless steel has the following analysis listed:

| | |
|---|---|
| Carbon | 0.08% maximum. |
| Chromium | 18.00% to 20.00%. |
| Nickel | 11.00% to 15.00%. |
| Molybdenum | 3.00% to 4.00%. |

The difficulty encountered has been both difficulty in obtaining sound welds which are free from underbead cracking, and also difficulty in holding an analysis in the weld bead of the first pass and the second pass which was within the type 316 or type 317 analysis range.

There is no standard wire composition having the analysis of type 316 or type 317, and if it existed it would be unsuitable to deposit such analysis in view of the dilution of the base metal or work, which is usually mild steel such as AISI 1030 or low alloy steel such as AISI 8620 or 4320, in any case containing less than 3% of total alloy by weight.

Type 310 stainless steel electrodes are not satisfactory as they lay down a bead which is fully austenitic and likely to give a poor result from the standpoint of underbead cracking, and of course do not comply with the desired type 316 or type 317 analysis.

Type 310 Mo is objectionable because there is uncertainty as to whether the bead will be austenitic or not.

Type 312 electrode is undesirable because it gives a deposit which is rather highly ferritic with the resulting disadvantage that the brittle sigma phase may form in the heat affected zones of neighboring weld beads, and also is contains more carbon than is desired and does not produce the desired analysis coresponding to type 316 or 317. Accordingly, there is no existing welding electrode which will produce the desired result and solve the problem.

In the new electrode of the invention, the composition has been carefully adjusted so that it will produce the following advantages:

(1) Under the dilution encountered in commercial submerged arc welding or in commercial protected gas atmosphere welding, the electrode of the invention will reliably produce weld beads in the first and second passes in overlay welding on plain carbon mild steel and low alloy mild steel analyses, which weld beads are within the range of type 316 and type 317 stainless steel.

(2) The ferrite present will be precisely controlled within a limit of 25 to 40% and this will result in controlling underbead cracking of the overlay.

In accordance with the invention the carbon in the welding electrode is maintained at 0.04% maximum and preferably at 0.03% maximum. This allows for pickup of carbon by dilution while still permitting the overlay bead to have a low enough carbon content so that good corrosion resisting properties will be obtained.

The manganese content of the electrode is between 1.5 and 2.4%. This range is set because manganese is an austenite former and it is desired to prevent the presence of excessive manganese so that it will not interfere with the proper range of retained ferrite. The manganese is also desirable because of its ability to combine with sulphur.

The silicon content is limited at 1% and preferably at 0.75% and most desirably at 0.50% maximum. Silicon contributes to danger of crack formation even though it aids in forming ferrite.

The sulphur and phosphorus limits in each case are 0.025% maximum.

Chromium is held within the limit of 30.0% and 32.0% so that by dilution with the plain carbon or low alloy steel base metal of mild steel carbon range a chromium content within the range of type 316 or type 317 stainless steel will be obtained. By the mild steel range it is intended to mean that the carbon content does not exceed 0.40%.

The nickel range is between 15.0 and 17.0% and this is controlled by the desire to have the proper nickel content after dilution and the desire to retain a substantial ferrite content in the weld bead to restrict crack formation.

Molybdenum is retained in the range of 4.0 to 5.0% so that it will be in the proper range after dilution and will properly contribute to control of ferrite. The molybdenum is of course helpful in obtaining proper corrosion resistance.

The nitrogen is limited to 0.1% maximum and preferably to 0.05% maximum in order to give effective control of the ferrite content.

It will be evident that the wire for producing the welding electrode of the invention, especially where it is a solid wire rather than a core sheath, need not be made by a wire drawing or other similar methods of production of wrought wire, but can be fabricated as a powder metallurgy extrusion properly sintered or a fiber metallurgy extrusion suitably sintered.

In the drawings I illustrate a welding electrode 20 having the composition of the invention which is maintaining an electric arc at 21 to the work 22 which consists of a mild steel plate of plain carbon steel analysis such as AISI 1020, 1030, or 1035, or a low alloy steel analysis such as AISI 4130, 8620 or 8420. Overlay weld beads 23 are deposited in succession on the surface of the work having an analysis within the range of type 316 or type 317 stainless steel. The dilution from the plate is of the order of 25 to 40%, and the extra alloy composition in the welding electrode compensates for the dilution. Sound weld beads are deposited containing 5 to 15% of retained ferrite.

The welding may be conducted using alternating current or direct current of straight or reversed polarity, suitably at 20 to 45 volts and 200 to 900 amperes.

FIGURE 2 illustrates a submerged arc welding setup, submerged arc welding flux 24 being deposited through feed tube 25 which is moving ahead of the electrode in the direction of the arrow 26. The arc 21 in this case is submerged beneath the flux 24. The flux composition will suitably have a maximum, minimum and preferred range as follows:

Zirconium silicate, between 50 and 1250 mesh, 5 to 75% by weight, preferably 10 to 25% and most desirably about 20%.
Lime, 0 to 50%.
Limestone, 5 to 15%.
Silica, 5 to 10%.
Alkali or alkaline earth fluoride, such as fluorspar or cryolite, 2 to 12%.
Ferroalloy such as ferrochromium, ferromanganese or ferrosilicon, 2 to 8%.

The above flux is described in Johnson and Campbell application Serial No. 708,110, filed January 10, 1958, for Welding with Self-Removing Flux, now Patent No. 2,955,193, dated October 4, 1960.

In the case of the submerged arc welding the electrode 20 is suitably a bare wire and solid metal in cross section.

The invention is also applicable to exposed arc gas shielded welding as shown in FIGURE 3 where the electrode 20' is fed by suitable feed mechanism to the exposed arc 21 through a welding head 27 which receives a protecting gas through pipe 28. The protecting gas may suitably be carbon dioxide, helium or argon, and is discharged at 30 to protect the arc with inert gas.

In the case of the exposed arc with gas protection as shown in FIGURE 3, the electrode has a suitable cross section as shown diagrammatically in FIGURE 4 or 5, consisting of a metallic envelope 31 and a flux core 32 as shown in FIGURE 4, the envelope in this case being of uniform cross section. An envelope 31' may also be used having intruding fins of metal 33 according to Danhier U.S. patent application Serial No. 635,239, filed January 22, 1957, for Automatic Arc Welding Process, Equipment and Electrode, now Patent No. 2,951,931, dated September 6, 1960, the fins extending into the flux core 32'.

The composition of the flux in the flux core electrode of FIGURES 4 and 5 may suitably be as follows:

In various compositions the core has a weight of between 24 and 42% of the weight of the metallic shell. The core will suitably contain 4 to 20% of the ferromanganese and other deoxidizers and 75 to 96% of slag-forming materials.

A specific example is:

Low carbon ferromanganese (containing 80% manganese) 12% by weight.
Slag-forming mixture 88% by weight.

The slag-forming materials of the core are composed of 60 to 85% by weight of titanium oxide, 4 to 20% by weight of manganese monoxide, 8 to 25% by weight of silica, the balance consisting mainly of ferrous oxide, alumina, lime, magnesia and alkalis.

A specific composition for the slag-forming mixture will preferably be:

| | Percent |
|---|---|
| Titania | 66 |
| Silica | 19 |
| Manganese oxide, plus alumina, plus lime, plus magnesia, plus sodium oxide, plus potassium oxide | 9 |

The above flux core is described in Danhier U.S. patent application Serial No. 635,239, filed January 22, 1957, for Automatic Arc Welding Process, Equipment and Electrode.

All percentages are by weight.

In view of my invention and disclosure, variations and modifications to meet individual whim or particular need will doubtless become evident to others skilled in the art, to obtain all or part of the benefits of my invention without copying the method and electrode shown, and I, therefore, claim all such insofar as they fall within the reasonable spirit and scope of my claims.

Having thus described my invention what I claim as new and desire to secure by Letters Patent is:

1. An electric arc welding electrode for overlay deposition of type 316 and type 317 stainless steel, which consists of a wire having the following analysis in percentage by weight:

| | |
|---|---|
| Carbon | 0.04 maximum. |
| Manganese | 1.5 to 2.4. |
| Silicon | 1.00 maximum. |
| Sulphur | 0.025 maximum. |
| Phosphorus | Do. |
| Chromium | 30.0 to 32.0. |
| Nickel | 15.0 to 17.0. |
| Molybdenum | 4.0 to 5.0. |
| Nitrogen | 0.10 maximum. |
| Iron | Balance. |

2. An electrode of claim 1, in which the nitrogen content is 0.05% maximum.

References Cited in the file of this patent

UNITED STATES PATENTS

| 2,219,462 | Wissler | Oct. 29, 1940 |
| 2,532,410 | Kennedy | Dec. 5, 1950 |
| 2,532,411 | Kennedy | Dec. 5, 1950 |

FOREIGN PATENTS

| 762,801 | Great Britain | Dec. 5, 1956 |